United States Patent [19]

Packham

[11] 4,191,506
[45] Mar. 4, 1980

[54] PROPELLER AND IMPELLER CONSTRUCTIONS

[76] Inventor: Lester M. Packham, 240 Kingsway Dr., N. Mankato, Minn. 56001

[21] Appl. No.: 862,367

[22] Filed: Dec. 20, 1977

[51] Int. Cl.² .................................................. F04D 29/38
[52] U.S. Cl. ......................................... 416/91; 416/232; 416/237; 416/DIG. 3
[58] Field of Search .................. 416/91, 92, 232, 237, 416/321 R, DIG. 3

[56] References Cited

U.S. PATENT DOCUMENTS

| | | | |
|---|---|---|---|
| 20,744 | 6/1858 | Thurber | 416/211 |
| 209,853 | 11/1878 | Benson | 416/188 |
| 1,246,086 | 11/1917 | Glantzberg | 416/210 X |
| 1,365,808 | 1/1921 | Wood | 416/232 X |
| 1,667,506 | 4/1928 | Bankrat | 416/91 |
| 1,857,909 | 5/1932 | Havill | 416/91 |
| 2,283,068 | 5/1942 | Johnson | 416/91 |
| 2,286,670 | 6/1942 | Condon | 416/91 |
| 2,408,788 | 10/1946 | Ludington et al. | 416/91 X |
| 2,422,388 | 6/1947 | Billings | 416/210 |
| 2,690,151 | 9/1954 | House | 113/116 D |
| 2,996,120 | 8/1961 | McGregor | 416/237 X |
| 3,551,070 | 12/1970 | Glucksman | 416/91 |
| 3,887,300 | 6/1975 | Quinn | 416/210 |

FOREIGN PATENT DOCUMENTS

| | | | |
|---|---|---|---|
| 807110 | 1/1937 | France | 416/91 |
| 124583 | 4/1949 | Sweden | 416/91 |

Primary Examiner—Everette A. Powell, Jr.
Attorney, Agent, or Firm—Romney, Schaap, Golant, Disner & Ashen

[57] ABSTRACT

A propeller or impeller construction having a plurality of blades mounted on a hub section. The blades are essentially triangular in cross section and are hollow to achieve light-weight and permit center air flow. In addition, the blades may be tapered in such manner that accelerated internal air movement with compression toward the tip ends is enabled. The tip portions of the blades may be vented to provide for air flow through the center and out of the tips, and also the rear structural plate may be vented to the low pressure side of the blades. Blade construction may provide for variations in the pitch angle. The blades are mounted on the hub section by a unique construction which may provide both commonality and interchangeability of parts. This construction also enables the use of shims to facilitate balancing and to change and/or adjust thrust characteristics without changing blades. The construction provides that high inertial loads are contained near or within the plane of rotation, thereby eliminating the need for massive and inefficient constructions normally required to absorb the extreme moments present when the inertial loads occur at an angle to the plane of rotation. The construction of the blades is such that the cross-sectional configuration and structural means in the basic design enhance the performance of a propeller fan so constructed when operating in its own self-created down draft. In addition, the invention provides a propeller fan construction of high strength-to-weight ratio with unusual economies of manufacture and assembly.

33 Claims, 16 Drawing Figures

Fig. 5

PROPELLER AND IMPELLER CONSTRUCTIONS

BACKGROUND OF THE INVENTION

1. Purpose of the Invention

This invention relates in general to certain new and useful improvements in propeller and impeller constructions, and, more particularly, to propeller and impeller constructions having blades of unique cross-sectional shape and configuration and which provide a unique mounting to a wide variety of structures.

2. Brief Description of the Prior Art

For many years, considerable study has been devoted to improving various aerodynamic structures, as for example, wind machines, aircraft and the like, in order to improve their efficiency. Conventional aerodynamic theory is based primarily on Bernoulli's Theorem and very little theory in airfoil design has changed since the early 1900's, except for the addition of flaps and slots on components which are driven through a gaseous (air) or through a liquid fluid. Considerable experimentation by F. G. Miles of Great Britain has been underway since about 1938 on boundary layer control, enforced circulation and pressurized air flow. This experimentation has been devoted to experiments to determine the results of "sucking and blowing" around an airfoil.

However, substantially all of the experimentation dealing with conventional aerodynamic theory seems to be confined to wing structures on conventionally styled aircraft, and little, if any, work has been conducted in the area of applying various aerodynamic theories to propeller or impeller design.

It has generally been believed that the geometric arrangement providing best aerodynamic efficiency for impellers and propellers is one that becomes well suited to a slender, thin, moderately twisted, metal extrusion. See, for example, U.S. Pat. No. 2,985,245 to Maloff.

In the conventional propeller and impeller design, a thrust is produced by the action of the impeller or propeller blades on the air which is propelled or impelled. This thrust is directly related to the change in energy level of the air passing with respect to the blades. Hence, one of the major problems presented is that the change in energy levels must be restrained by balancing out the reacting forces in the blades. Another one of the major problems encountered is the mounting of the blades to a central rotating hub. The conventional geometry of the slender, thin, twisted, metal extruded blade creates large bending moments in the region of the hub, and these bending moments may actually exceed the tension stresses caused by centrifugal force.

The development of the propeller driven aircraft has been accompanied by increased applications for large diameter propeller fans, impellers, rotors, and the like. Basic design for such devices has been largely restricted to blades where the cross sections thereof resemble airfoils of a type providing a high lift/drag ratio and are similar in shape to the cross section of aircraft wings.

Propeller fans of this type have cross sections which are commonly found in applications such as cooling towers, large ventilating fans and wind machines used for frost protection. These fans are generally heavy in weight and require a massive and inefficient hub section and are difficult and costly to manufacture.

The design of these devices is generally based on considerations of "lift vs. drag" ratios rather than the more pertinent "mass flow rate vs. energy expended" ratio. The dependence on constructions based primarily on conventional propellers and airfoils, for applications relating to what can be described as fixed position fans, has ignored the needs for economies of manufacturing, economies of operation and overall improvements in performance in those applications. Such constructions have ignored the needs of industry outside of the aerospace industry for a fan construction that features low cost, noise suppression and energy conservation.

SUMMARY OF THE INVENTION

In describing the present invention, the terms propeller and impeller are used in the generic sense in order to encompass all forms of rotating blade devices which are used to create a movement of a fluid including a gas, such as air, or a liquid, such as water. The present invention as described, and thus the terms propeller and impeller, also include those rotating blade devices utilized to capture gaseous (wind) or liquid energy and convert it to mechanical energy.

The present invention relates to a propeller or impeller construction which is comprised of a central hub section and a plurality of blades mounted to a hub plate forming part of the hub section and extending radially therefrom. The hub section is comprised of the hub core, the aforesaid hub plate, the inboard ends of the blades and the mounting means whereby the blades are attached to the hub plate. This construction of the hub section utilizing a hub core and hub plate provides economy and commonality of many parts in manufacturing as well as providing for interchangeability of blades, if required.

The blades used in the construction are uniquely designed so that the cross-sectional shape is triangular and the blades have a hollow interior. Basically, the blades are comprised of three plates, joined together at or near their edges. This design provides a very high strength, light-weight blade, and also offers ease and economy of manufacture.

The construction of the hub section, combined with the large cross-sectional area of the blades and the strength and simplicity of the mounting means are further enhanced by the ease of providing a "built-in" dihedral angle for the blades in the mounting means, thereby providing stress reduction in the joining areas as well as increased dynamic stability of the fan assembly.

The present invention, in the construction of the hub section provides a capability of containment of very high inertial stresses through the clamping action of the mounting means. In addition, the mounting means is such that with the use of shims, the blade angle of attack may be changed or adjusted. The use of a hub plate in the hub construction provides an economical and simple means of attaching blades in various arrangements and various sizes to the hub section.

In the present invention, the blade construction is essentially triangular in cross section and is hollow. The blade construction is comprised of three longitudinal plates, joined together at or near their longitudinal edges to provide the triangular hollow cross section. Two of the longitudinal plates primarily serve a structural function and are joined together to form the basic blade geometry. This joining may be accomplished by the bending of one wide plate to form two attached plates of the required dimensions or by mechanical connection or sealing at the common edges. These two plates are referred to as the forward structural plate and the rear structural plate. The third plate in the construction is the pressure plate and constitutes that part of the blade that exerts pressure against the fluid through which it is passing in order to direct the fluid in the desired direction. The third plate, or pressure plate, is attached to the remaining edges of the two structural plates. This construction combines the rigidity of the joining of the two structural plates with the "pull sheet" effect of the pressure plate to provide a blade of very high strength-to-weight ratio.

In the present invention the blade construction as described enables additional and desirable features to be incorporated into the construction at minimum cost and effort. For example, trim tabs may be added dimensionally or attached to the pressure plate if required or desired for dynamic balancing and/or stability. An additional feature is that the longitudinal dimensions of the blades may be straight or tapered and that the angle of attack of the pressure plate can be made variate throughout its length. The angle of attack of the pressure plate is dependent on the ratio of the widths of the forward and rear structural plates and the angle of their joining. Any variation in the width ratio and/or the joining angle will result in a difference in the angle of attack. As in conventional blade construction, tapering the blades to reduce the pressure area and a reduction in the angle of attack towards the tip ends where the velocity increases will increase the overall efficiency of the propeller fan as well as reduce noise from "tip splatter".

The present invention in its construction, and, in particular that configuration featuring tapered blades and the reduced angle of attack combined with the hollow cross section, provides a unique method of utilization of the quiescent air found around the hub areas of conventional constructions so as to enhance the efficiency of the propeller fan and decrease the energy requirements. In the hollow blades of the present invention, rotation of the propeller fan assembly creates a centrifugal force that, in effect, sucks this still air into the hub end of the blades and expels it out of the tips. By reducing the cross section, and hence the apertures at the tips of the blades, and by tapering the blades and/or reducing the angle of attack, this same rotational centrifugal force will also provide a means of compression combined with accelerated velocity of that air when it is expelled. The compressed air may be expelled at the tip where it will aid in decreasing tip spillover and in noise suppression, as well as to negate the effect of cross winds on the dynamic balance of the fan. The compressed fluid also may be expelled out through apertures provided in the rear structural plate in place of or in addition to the tip apertures.

If fluid expulsion is out of the rear structural plate through relatively large openings near the tip, the thrust of the compressed air can assist in the rotation of the fan and lessen energy requirements to maintain RPM and velocity. In some applications, it may be more desirable to vent the compressed air or other fluid out of the rear structural plate through smaller but numerous vents located over the length of the blade, thereby equalizing the low pressure area normally found at the trailing portion of the blade.

In the present invention, the hollow cross section and associated apertures and vents can be utilized where it is desirable to disperse other gases and/or liquids into the fluid stream or where it may be desirable to introduce compressed gases and/or liquids from remote locations for propulsion purposes.

OBJECTS OF THE INVENTION

It is, therefore, the primary object of the present invention to provide a propeller fan of large diameter having a novel hub section construction combined with blades of unique construction.

It is another object of the present invention to provide a propeller fan of the type stated which results in a total fan construction that achieves characteristics of strength with light weight, economies and ease of manufacture and interchangeability of parts while maintaining or improving performance compared to the prior art constructions.

It is a further object of the present invention to provide a propeller or impeller construction having blades of unique cross-sectional shape and configuration which is designed to eliminate various thrust and bending moment problems on a mounting hub.

It is another object of the present invention to provide an impeller or propeller construction in which the blades of such construction may be mounted to the hub on a highly efficient basis in order to allow interchangeability of blades.

It is a further object of the present invention to provide a propeller or an impeller blade which is not only highly efficient in its operation, but which can be manufactured at a relatively low unit cost.

It is an additional object of the present invention to provide a propeller or impeller blade which compresses air in the blade by centrifugal force thereon and permits air flow through the blade to increase efficiency thereof.

It is another salient object of the present invention to provide a method of making a propeller or impeller construction which is highly efficient and requires use of materials that can be assembled on a relatively low cost basis.

With the above and other objects in view, my invention resides in the novel features of form, construction, arrangement and combination of parts presently described and pointed out in the claims.

BRIEF DESCRIPTION OF THE DRAWINGS

Having thus described the invention in general terms, reference will now be made to the accompanying drawings in which:

FIGS. 2A and 2B are composite sequential views showing the effects of an air foil in a wind stream and in which:

DETAILED DESCRIPTION

Referring now in more detail and by reference characters to the drawings which illustrate practical embodiments of the present invention, A designates a propeller or impeller construction generally comprised of a central mounting section 10. A pair of outwardly extending propeller or impeller blades 12 are suitably mounted to the central mounting section 10 by a mounting means more fully described hereinafter.

The terms "propeller" and "impeller" are used in their generic sense in order to encompass all forms of rotating blade devices which are used to create a movement of a fluid such as air or similar gaseous fluid, or otherwise a liquid such as water, in some manner. In the more preferred aspect of the invention, the terms "propeller" and "impeller" will comprise fan blades for moving air or other fluid where the fan operates to move the air or the fluid as opposed to being moved by the air or the fluid. Thus, the propeller and impeller constructions of the present invention can be used on various types of wind machines and like equipment. For example, the constructions of the present invention are highly effective in a conventional fan construction adapted to move cooling air and in other types of ground effect machines.

Figures 1, 3A, 3B:
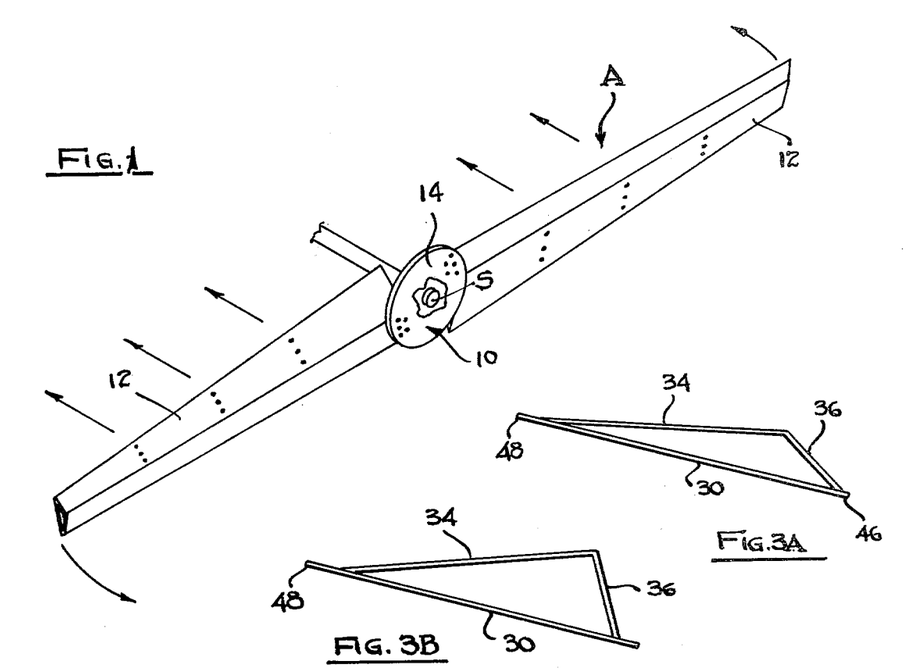
FIG. 1 is a fragmentary perspective view showing a propeller fan construction mounted on a shaft to function as a power wind producing fan.
FIG. 3A is a vertical sectional view of a preferred embodiment of the blade cross section forming part of the fan of the present invention.
FIG. 3B is a vertical sectional view of another embodiment of blade construction illustrating how the angle of attack can be varied by changing the joining angle of segments of the structural plate.

FIG. 1 illustrates the propeller or impeller construction mounted on a suitable rotating shaft S such that the construction A of the present invention operates as a type of fan. A relatively flat metal mounting plate 14 forming part of the mounting means 10 is secured to the shaft S in a manner to be hereinafter described in more detail. In this case, the shaft S could be powered by means of any suitable prime mover such as an electric motor (not shown) in order to cause rotation of the blades 12 to thereby function as a fan.

The mounting section which forms part of the propeller and impeller construction of the present invention is more fully illustrated in FIGS. 4-7 of the drawings. The mounting plate 14 is removably but rigidly secured to a cylindrically shaped tubular central hub 16 in the form of a sleeve having a central bore 18 capable of accommodating the shaft S. The plate 14 is secured to the central hub 16 by means of bolts 20 which extend through aligned apertures formed in the hub 16 and in the mounting plate 14. These bolts are retentively secured by locking nuts 22 as more fully illustrated in FIGS. 6 and 7 of the drawings.

Figure 6:
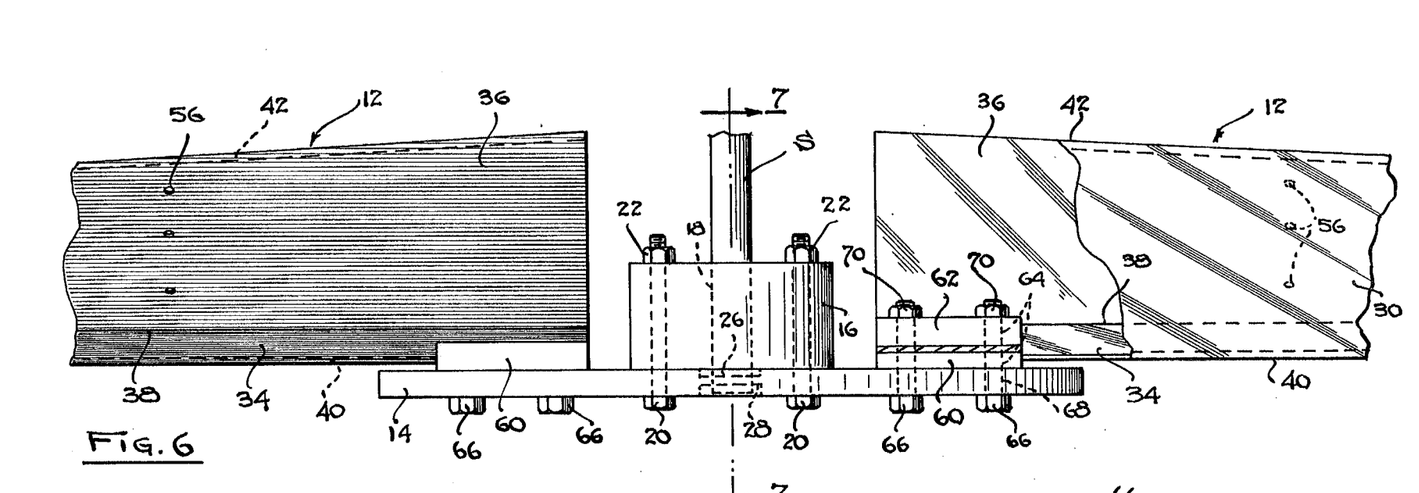
FIG. 6 is a fragmentary side elevational view, partially in section and taken along line 6—6 of FIG. 5.
Figures 7, 8, 9:
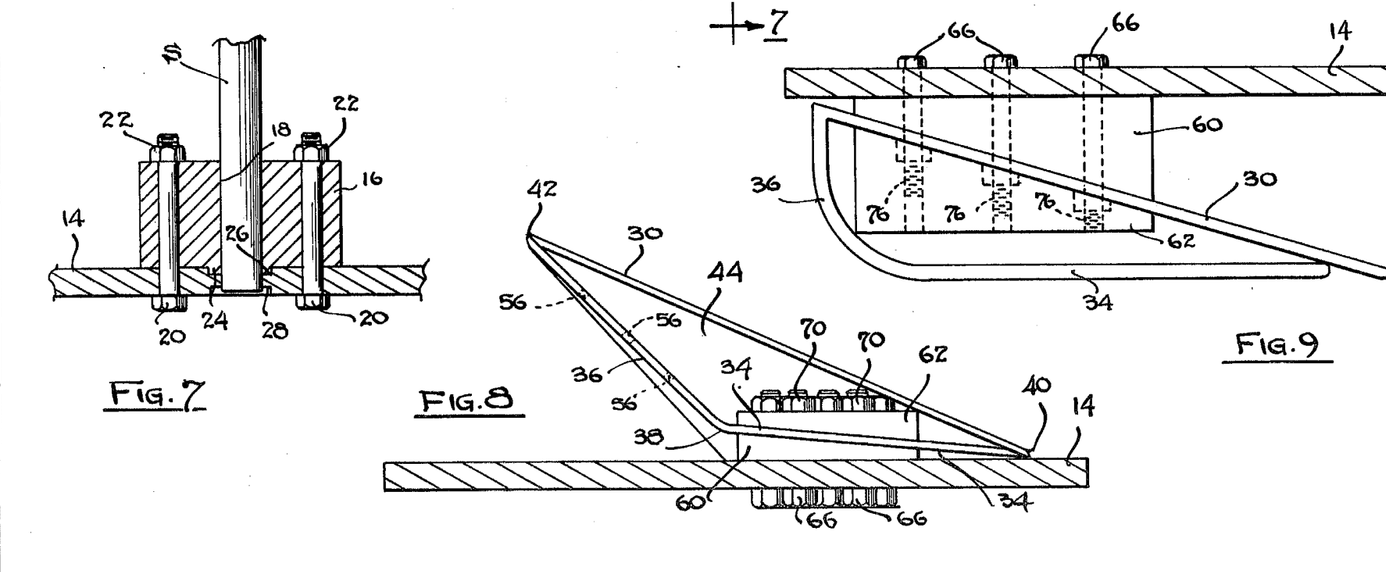
FIG. 7 is a fragmentary vertical sectional view taken along line 7—7 of FIG. 6.
FIG. 8 is a vertical sectional view, taken along line 8—8 of FIG. 5, illustrating the clamping action of the mounting means against the front structural plate according to the present invention.
FIG. 9 is a vertical sectional view, similar to FIG. 8, and illustrating another embodiment of the mounting means.

Referring now to FIG. 7, it can be observed that the central hub 16 is provided with a forwardly extending diametrally reduced cylindrically shaped locating and indexing boss 24 which fits within a corresponding recess 26 formed in the rearwardly facing surface of the mounting plate 14, reference being made to FIG. 6. It can be observed that the boss extends around the central bore of the hub 16. Moreover, while the boss is cylindrical in shape, it should be observed that the boss could have a rectangular or other shape for proper indexing relationship with a corresponding shaped aperture in the mounting plate 14. In this way, the mounting plate 14 can be properly located with respect to the mounting hub 16 in order to prevent any radial offset which would otherwise affect the rotation of the propeller or impeller blades. In like manner, the forward surface of the plate 14 is similarly provided with a recess 28 through which the shaft S will extend. The exact means for securing the shaft S to the hub 16 is conventional and neither illustrated nor described herein. However, a conventional key and keyway means or other locking means could be employed.

The construction of the mounting means utilizing a hub mounting plate and a hub or so-called "hub core" provides economy and commonality of many parts in manufacturing as well as for the interchangeability of blades as hereinafter described. Moreover, the mounting plate can always be mounted to the hub core in the desired position by means of the locating boss and the recess formed in the plate. By employing a plurality of hub cores with central cores of differing internal diameters it is possible to merely change the hub core to accommodate any type of existing shaft. The mounting plate 14 would also have apertures aligned with any of the existing hub cores in order to accommodate the bolts 20.

The construction of the blades 12 is more fully illustrated in FIGS. 6, 8, 9, 11 and 12. Each of the blades 12 are comprised of a first plate 30 which functions as a pressure side of the blade 12 and a structural member 32 comprised of a plate 34 and a second angulated plate 36 integrally connected through a corner margin 38. The plate 34 is welded or otherwise suitably secured at one edge to the plate 30, forming a joinder edge 40, and being located at an angle of about 22.5° with respect to the plate 30 at the hub end. The plate 36 is welded or otherwise secured at one end to the opposite edge of the plate 30 forming a joinder edge 42, in the manner as illustrated in FIG. 8. In addition, the plate 36 is secured to the plate 30 at essentially the same angle as the plate 34 is secured to the plate 30, at least at the hub end thereof.

Figure 11:
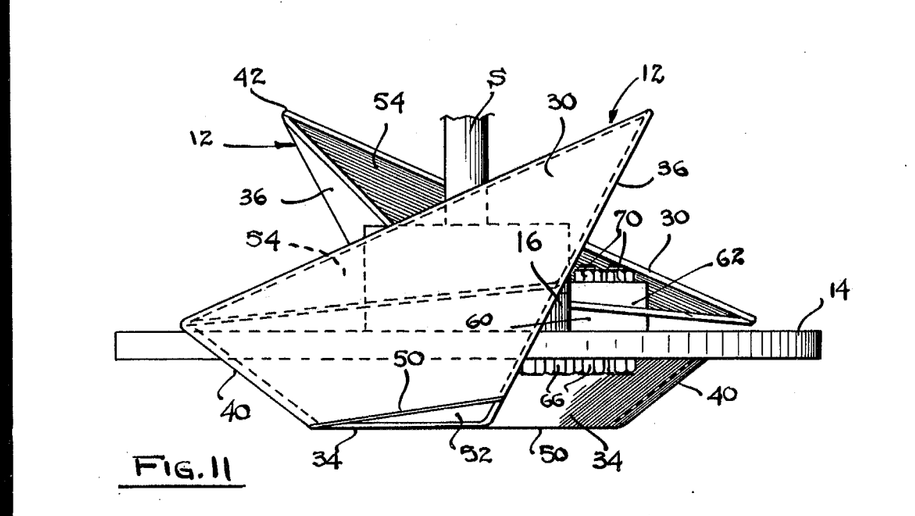
FIG. 11 is an enlarged end elevational view of the blade construction of FIG. 4.

In accordance with this construction, the blade assumes a somewhat triangular shape with a hollow interior 44. FIG. 8 illustrates the hub or mounting end of the blade, whereas FIG. 11 illustrates the tip end of the blade. In this case, it can be observed that the various plates 30, 34 and 36 are tapered inwardly from the hub end of the blade to the tip end of the blade. Moreover, it can be observed that the acute angles between the plates 34 and 36 with respect to the plate 30 are also reduced progressively throughout the length of the blade toward the tip end thereof. Thus, at the tip end of the blade the plate 34 forms an angle of about 8° with respect to the plate 30. The triangular cross section of the blades combines the strength and rigidity of the structural plates 34 and 36, with the pull-sheet effect of the pressure plate 30, which is in tension when rotating.

FIG. 8 more fully illustrates the cross-sectional shape of one of the blades as constructed in accordance with the present invention. FIG. 3A illustrates a modified form of cross-sectional shape of the blade in which the plate 30 has terminal portions 46 and 48 which extend beyond the terminal margins of the plates 34 and 36. Thus, the plate 30 does not have to terminate at the terminal margins of the plates 34 and 36. FIG. 3B shows a similar construction except that the plate 30 is provided with only terminal edge 48 extending beyond the terminal edge of the plate 34. Moreover, the plate 36 forms a greater angle with the plate 30 in the construction of FIG. 3B, than in the construction of FIG. 3A. In each case, it is important to note that it is possible to vary the pitch angle of the pressure plate 30 by varying the joining angle of the two structural plates, namely the plates 34 and 36. As shown in FIG. 8, the air flow is directed away from the mounting plate 14 by the blades, whereas the configuration as shown in FIG. 9 shows the air flow directed toward the plate 14.

Figure 3C:
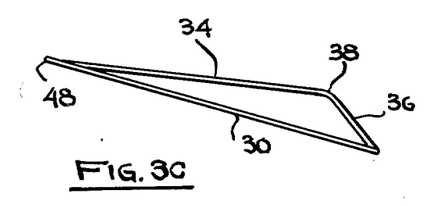
FIG. 3C is a vertical sectional view of yet another embodiment of the blade cross section.
Figure 3D:
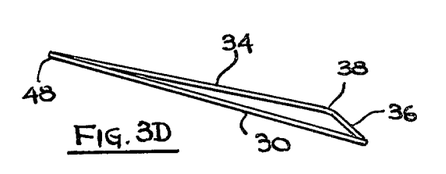
FIG. 3D is a vertical sectional view of a further blade construction illustrating how the angle of attack can be varied by changing the ratio of the widths of the front and rear structural plates.

FIGS. 3C and 3D also illustrate techniques for varying the pitch angle of the pressure plate by varying the ratio of the widths of the two structural plates 34 and 36. With respect to the construction of FIG. 3C, it is to be noted that the plate 36 integrally merges into the plate 34 through a rounded corner 38. In like manner, in the construction in FIG. 3D, the plate 36 integrally merges into the plate 34 through a somewhat rounded corner but has a shorter dimension than in FIG. 3C.

The constructions of 3A–3D illustrate that the acute angle formed by the joining of the pressure plate 30 and the structural plate 34 is dependent on the angle formed by the joining of the forward structural plate 34 and the rear structural plate 36. In addition, FIGS. 3C and 3D illustrate constructions where the acute angle formed by the joining of the pressure plate 30 and the forward structural plate 34 is also dependent upon the ratio of the width of the plate 34 and the width of the plate 36. In this way, the cross-sectional area of these constructions can be varied and the angle of attack of the pressure plate can be varied simply and economically.

As indicated, the flat plate 30 serves as a pressure plate. The plate 34 serves as a forward or "leading" structural plate and the plate 36 serves as a rear or "trailing" plate. This construction provides the rigidity and dimensional form to the blades 12 and provides a triangular configuration with a hollow interior.

Figures 4, 10:
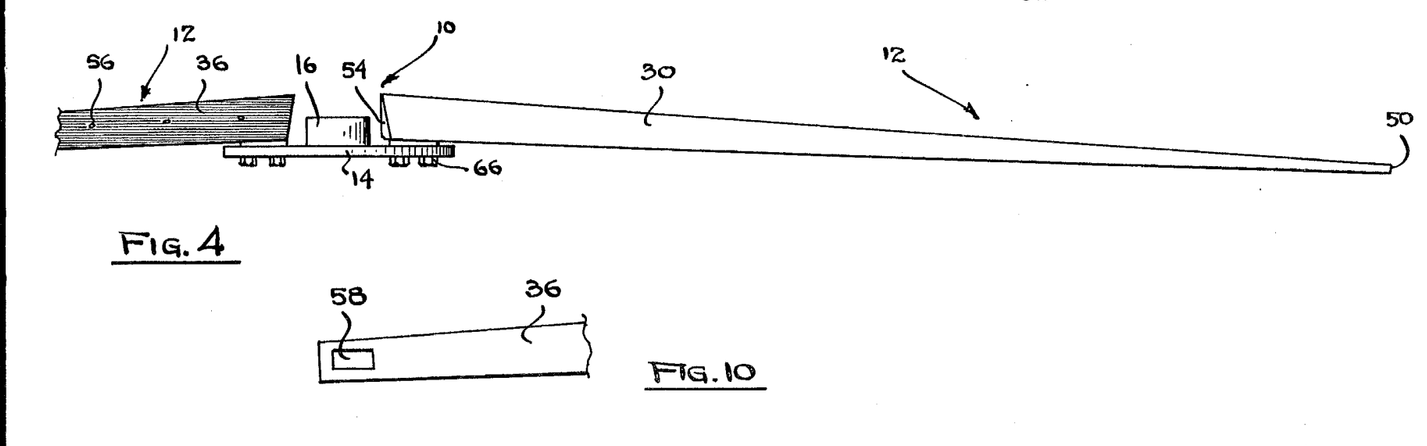
FIG. 4 is a fragmentary side-elevational view of a propeller fan construction in accordance with the present invention.
FIG. 10 is a fragmentary side-elevational view of a modified form of the blade construction of FIG. 4.

By reference to FIGS. 1, 4 and 11, it can be observed that the plate 30 functions as the ram side of the blade, whereas the plates 34 and 36 function as the structural side of the blade. The outer end of each of the blades 12, that is the tip ends 50, are provided with openings 52 to permit the exit of compressed air from within the hollow interior of the blade. In addition, the hub end of the blade is also provided with an open end 54 which permits the entry of air into the hollow interior 44 of the blades 12. As air is introduced into the hub end 54 of the blade 12, it may be compressed during rotation of the blade through centrifugal forces and may exit the outlet end 52.

In another embodiment of the invention, the rear side of the blade may be provided with a plurality of apertures 56 which are spaced apart from each other axially along the length of the blades, as illustrated in FIG. 4. Alternatively, the apertures 56 may extend laterally across the rear side of the blade as illustrated in FIG. 6. These apertures 56 are designed to permit escapement of air which is compressed within the blade to the low pressure side of the blade. As indicated, when the air is allowed to flow out of the back side of the blade where the low pressure area is formed, the blade will be more efficient by reason of the lower differential pressure between the ram air deflected by the blade and the air directly behind the blade.

In an additional embodiment of the invention a slot 58 is provided in the rear side of the blade, e.g. the plate 36, near the tip end, as illustrated in FIG. 10. This slot 58 provides for the discharge of high pressure air near the blade tip to facilitate rotation of the fan. The pressure of the air being vented can be increased by increasing the blade length, increasing the rotational speed, or reducing the blade cross sectional area towards the tip of the blades or any combination of the above without loss of normal propeller fan efficiency. If desired the air flow into and through the blades may be augmented from other external sources.

Figure 2A:
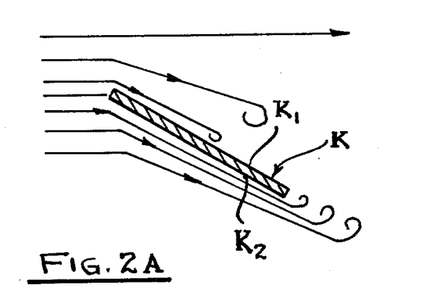
FIG. 2A is a schematic illustration showing a conventional thin flat airfoil blade angulated with respect to the fluid direction, and showing air currents on one side of and behind the airfoil blade.

The present invention utilizes a system where the centrifugal force exerted on the air inside the hollow blade may be used to cause the air to be compressed and directed to fill the area opposite the pressure side of the blade, or, otherwise, to direct the air out of the tips in order to increase efficiency. Referring now to the composite FIGS. 2A and 2B, it can be observed that a blade of uniform width and thickness moving through the air at a constant speed increases its ram effect on the air as the angle of attack is increased, as illustrated. Thus, referring to FIG. 2A, it can be observed that a relatively flat blade, designated as K, essentially creates no turbulent effect in the air stream when its longitudinal axis is parallel to the movement of the air stream. When the angle of attack is increased, the air flow on side $K_2$ of the blade K is compressed and forced downwardly. Further, the opposite surface or low pressure surface $K_1$ permits a turbulent low pressure area to be formed on the blade surface.

Figure 2B:
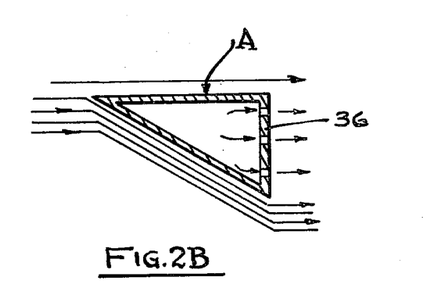
FIG. 2B is a schematic illustration, somewhat similar to FIG. 2A, and showing the unique fluid flow arrangement achieved with a propeller or impeller construction in accordance with the present invention.

It can be observed that as the angle of attack increases, the amount of air moved also increases. The reaction force on the blade and the area of low pressure turbulence are also increased. FIG. 2B schematically illustrates a blade in accordance with the present invention. In this case, the present invention permits pressurization of the area immediately behind the blade by air flow through the back or lower pressure side of the blade so that the blade is actually more efficient. Thus, it can be observed that little turbulence is created behind the blade construction herein.

Conventional propeller designs attempt to equalize loads along the blade by changing the air foil cross section and angle of attack from the hub to the tip with very little change in propeller width. However, it can be observed that a change in width narrowing toward the tip would also cause a change in load which in the case of the present invention is made approximately proportional to the change in velocity. This construction also allows the hub section to have the greatest area where it is needed for the greatest strength.

The tapering of the blade from the axis of rotation, namely that is the area proximate to the hub end outwardly to the tip end, may or may not result in a change in the angle of attack incorporated in the blade design. As illustrated in the preferred embodiment, a change in the angle of attack is incorporated where the angle of attack decreases from the hub to the tip end.

Figure 5:
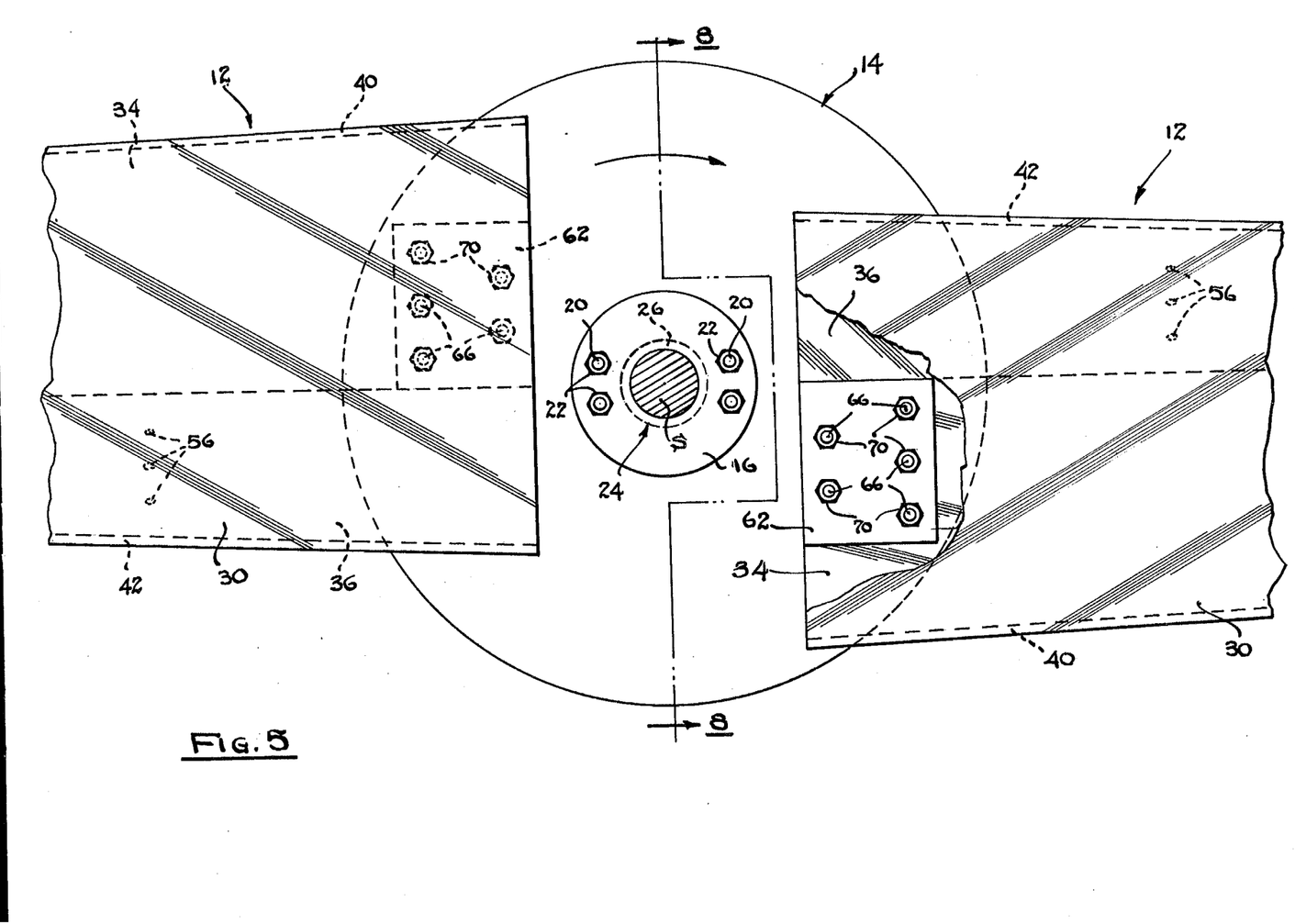
FIG. 5 is a fragmentary rear elevational view, partially broken away and showing the means for mounting the blades to a central hub plate and the means for mounting the hub plate to a hub core in accordance with the present invention.

FIGS. 5, 6 and 8 more fully illustrate the means for attaching the blades 12 to the mounting plate 14 through the use of mounting blocks or spacers, or so-called "shims", 60 and 62. FIG. 5 more fully illustrates the mounting of the pair of outwardly extending blades in such manner that the blades are axially offset from each other. The shims 60 constitute the lower shims and each have a flat surface in contact with the plate 14. In like manner, the upper shims 62 are located in the hollow interior 44 of the blades 12. In this way, the pitch of the blade can be adjusted through the use of these spacers 60 and 62. Moreover, it can be observed that the shims 60 and 62 are provided with a plurality of apertures 64 in order to accommodate the stud sections of bolts 66 which also extend through apertures 68 in the plate 14. At their inner and rearward ends, the bolts are secured with locking nuts 70.

The use of the spacers or shims permits variation of the pitch as may be desired for a particular application. Moreover, these spacers 60 and 62 allow for the balancing of the individual blades on the mounting plate 14. In addition, by changing the various spacers 60 and 62, it is possible to adjust for thrust changes without changing of the blades. The bolting of the blades to the plate 14 permits interchangeability of the blades in a convenient manner. This means of attachment also permits individual blade adjustment, along with decreased manufacturing costs.

Inasmuch as the plate 14 is not twisted, the plate 14 also permits convenient interchangeability of blades, as well as convenient interchangeability of spacers and hub cylinders. The plate 14 due to its construction, acts as a reference plane for a blade angle of attack and, in like manner, aids in the decrease of manufacturing costs.

By further reference to FIG. 4, it can be observed that the blades 12 are angulated downwardly at a dihedral angle with reference to the axis of the mounting plate 14. This provides that the blade tips 50 are located below a line passing horizontally through the plate 14 by a pre-determined angle. This angle can be achieved by use of the shims, 60 and 62 or otherwise machined into the mounting plate 14. By use of this dihedral, which may be variable, through the employment of shims or spacers, it is possible to increase stability, facilitate balancing and to control bending moments at the critical joining of the blades to the mounting section.

FIG. 9 illustrates an embodiment of the invention in which the pressure plate 30 is clamped between the shims 60 and 62, on the forward surface of mounting plate 14. In this way, the flat surface of the front structural plate 34 is generally parallel to the plane of rotation of the propeller fan, thereby providing strength to resist high inertial loading. It can also be observed that the clamping action for clamping the blades to the mounting plate 14 is also achieved with the bolts 66 and threaded apertures 76 in the shim 62. In this case, however, the position of the bolts is reversed with respect to the position as shown in FIG. 8. This type of arrangement is desirable where structure clearance presents assembly problems and where inertial loads are low, and it is desirable to direct air flow toward the mounting plate 14.

Figure 12:
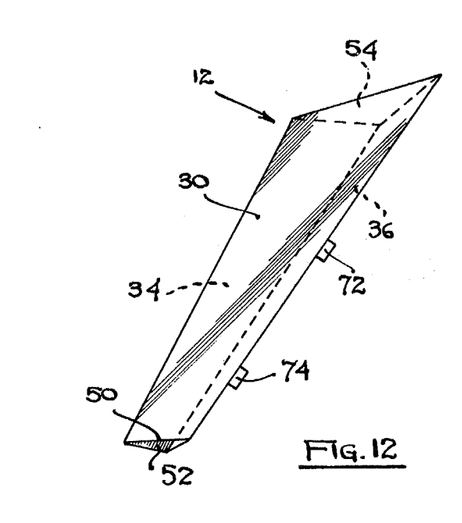
FIG. 12 is a somewhat schematic perspective end view of one of the blades forming part of the present invention.

By reference to FIG. 12 of the drawings, it can be observed that inboard and outboard trim tabs 72 and 74 may be provided on the blades in order to achieve stability and to facilitate dynamic balancing. In addition, the double flanged edges on the pressure side 30 of the blade provide increased strength and also facilitate in welding and other forms of securement.

It can be observed that the construction of the present invention provides many unique advantages not heretofore available. By employment of blades with the unique cross-sectional configuration, the angle of the thrust or angle of attack of the blade can by changed by merely changing the taper from the hub end to the tip end. Furthermore, by venting compressed air from the tips of the blades and through the back side of the blades, on the broad surface thereof, the drag effect is decreased. In this respect, the blades as illustrated are generally triangular in cross section. The exact shape of the blade does not necessarily have to be of a true triangular shape, although the cross-sectional shape should approach a triangular shape.

By virtue of having the blades located in the arrangement as illustrated in FIGS. 5 and 6, the blades have the hub end which is leading and the tip which is lagging, thereby providing a "swept-wing" effect. In this way, the leading edge (angle of attack) changes relative to the trailing edge. If the tip of the blade trails, there is a tendency for the air to slide along the blade toward the tip end. However, if the tip of the blade leads, the air will flow toward the center of the blade. When the air slides off toward the tip of the blade, the same effect is generated as in a swept back aircraft wing. In accordance with the invention, it is possible to keep the spillover at the tips relatively small.

By using the proper dihedral so that the tips of the blade are below the hub plate or mounting plate, it is possible to obtain a preconing of the fan blades. Thus, the plate of the fan blades in rotation takes on a conical shape. By this preconing effect, centrifugal force and thrust loading are equalized, and there is less strain on the mounting means.

The blade constructions of the present invention provide high strength-to-weight ratio and provide high inertial capabilities as an impeller device. The construction permits performance at peak efficiency in its own self-created down draft of the fan.

The foregoing embodiments of the invention have illustrated and described unique propeller fan and impeller constructions designed to increase efficiency and construction economies and which fulfills all of the objects and advantages sought therefor. Many changes, modifications, variations and other uses and applications will become apparent to those skilled in the art when considering this disclosure. However, the invention is not to be limited to the details disclosed herein, but is to be accorded the full scope of the claims so as to embrace any and all equivalent constructions.

Having thus described my invention, what I desire to claim and secure by Letters Patent is:

1. An improved propeller or impeller blade which is formed by a first relatively flat longitudinally extending plate, and a structural member bent to form second and third integrally connected relatively flat and longitudinally extending plates angulated with respect to each other, the second and third longitudinally extending plates being secured to said first plate thereby providing a substantially triangular blade in cross section and which said three plates form a substantially hollow interior chamber in said blade, one of said second or third plates functioning as a leading plate and the other of said second or third plates functioning as a trailing plate in the blade, and said first plate functioning as a ram side of said blade and serving as a pressure plate, said blade having a hub end and a tip end and said plates forming an opening at said tip end communicating with said hollow interior chamber.

2. The blade of claim 1 further characterized in that said blade is tapered from said hub end to said tip end so that at least one of said plates has a wider dimension at the hub end than at the tip end.

3. The blade of claim 2 further characterized in that said blades are provided with an opened portion to vent and decrease fluid flow from a high pressure side to a low pressure side of said blade when rotating.

4. An improved propeller or impeller blade which is substantially triangular in cross section and having at least three wall sections angularly disposed to each other and forming an internal chamber, at least two of said wall sections being tapered from a first end to a second end so that said internal chamber has a constantly and progressively reduced cross sectional area from said first end to said second end and with the shape of said cross sectional area being substantially constant from said first end to said second end, means forming an opening in said first end in fluid communication with said internal chamber and to permit entrance of fluid into said internal chamber, means forming another opening at second end and in general alignment with the opening at said first end permitting escapement of said fluid, the reduction in said cross sectional area toward said second end being sufficient so that centrifugal force created by the rotation of said blade causes compression of said fluid and escapement from said opening in said second end to aid in decreasing tip spillover and in suppression of noise.

5. The improved propeller or impeller blade of claim 4, further characterized in the opening formed in the second end of said blade lies substantially in a plane substantially parallel to the plane of the opening in the first end of said blade.

6. The improved propeller or impeller blade of claim 4, further characterized in that a plurality of fluid escapement apertures are formed on the back side of said blade to permit fluid passage into a low pressure area present at the back side of said blade when rotating.

7. The improved propeller or impeller blade of claim 4, further characterized in that all three of said wall sections are tapered from said first end to said second end to form said blade with a substantially triangular cross section and with the internal chamber having the constant and progressively reduced cross sectional area.

8. A propeller or impeller construction comprising a central hub means, a mounting plate and a plurality of propeller or impeller blades, and a plurality of mounting assemblies with a separate mounting assembly for mounting each blade on said mounting plate, each of said blades being formed by three longitudinal plates angulated with respect to each other thereby providing a substantially triangular blades in cross section and in which the three plates in each blade form a substantially hollow interior chamber in each said blade, each said mounting assembly for mounting each of said blades comprising a first block located on the exterior of said blade and having a surface in facewise contact with one of the plates of said blade, said first block also being located in facewise contact with said mounting plate, a second block located on the interior of said blade in facewise contact with the same one of said plates as said first block, said second block having a surface which is in facewise contact with said last named plate of said blade and which surfaces of said blocks are generally parallel to each other, and bolt means extending through one of said blocks and at least into the other of the blocks to thereby secure the blade to the mounting plate, the surfaces of said blocks in facewise contact with the plate of said blade being angularly disposed to the surface of the plate to which the blade is mounted.

9. The construction of claim 8, further characterized in that said flat plate for mounting said blades is circularly shaped, and said hub means comprises a sleeve for attachment to said flat plate and for engagement with a rotating shaft.

10. The construction of claim 9, further characterized in that said flat plate is provided with a recess on one flat surface and said sleeve comprised a shoulder capable of fitting into said recess on said flat plate for locating and and indexing said flat plate with respect to said sleeve so that said flat plate can be easily removed from and resecured to said core.

11. The construction of claim 10, further characterized in that said flat plate comprises indexing means for properly locating and mounting said blades to said plate.

12. The construction of claim 9, further characterized in that said sleeve is provided with a central bore to enable said sleeve to be fitted over and secured to a rotatable shaft which is rotatable with said flat plate.

13. The construction of claim 9, further characterized in that bolt means secures said flat plate to said sleeve.

14. The construction of claim 10, further characterized in that said mounting blocks also function as shims and the flat surfaces of said blocks in facewise contact with said blades enable the locating of said blades at a dihedral angle with respect to said plate.

15. The construction of claim 14, further characterized in that said construction provides a plurality of sleeves having different sized central bores to accommodate different shafts and with each sleeve having a shoulder capable of fitting into the recess on said flat plate so that each sleeve can be mounted to said flat plate.

16. The construction of claim 14, further characterized in that said blocks clamps one of the said longitudinal plates forming said blades in a plane generally parallel to a plane of rotation of the blades.

17. The construction of claim 8, further characterized in that said blade has a hub end and a tip end and said blade being tapered from said hub end to said tip end.

18. The construction of claim 17, further characterized in that said blade ends are open.

19. The improved impeller or propeller blade of claim 1 further characterized in that said blade forms part of a construction comprised of a mounting plate, the blade and a means for mounting said blade to said plate, said means for mounting comprising a first block located on the exterior of said blade and having a surface in facewise contact with one of the plates of said blade, said first block being located in facewise contact with said mounting plate a second block located on the interior of said blade in facewise contact with the same one of said plates as said first block, said second block having a surface which is in facewise contact with said last named plate of said blade and which surfaces are generally parallel to each other, and bolt means extending through one of said blocks and at least into the other of the blocks to thereby secure the blade to the mounting plate.

20. The construction of claim 19 further characterized in that the surfaces of said blocks in facewise contact with the plate of said blade being angularly disposed to the surface of the plate to which the blade is mounted.

21. The improved propeller or impeller blade of claim 4 further characterized in that said blade is comprised of a first relatively flat longitudinally extending plate and a structural member bent to form second and third integrally connected relatively flat and longitudinally extending plates and which second and third plates are secured to said first plate.

22. The improved propeller or impeller blade of claim 21 further characterized in that one of said second or third plates functions as a leading plate and the other of said second or third plates functions as a trailing plate in the blade and said first plate functioning as a ram side of said blade and serving as a pressure plate.

23. A propeller or impeller construction comprising:
(a) a central hub means comprised of;
 (1) a sleeve having a central bore for disposition over a rotatable shaft,
 (2) indexing means on a forward end of said sleeve,
(b) a relatively flat mounting plate comprised of;
 (1) a rearwardly facing flat surface,
 (2) a forwardly facing flat surface generally parallel to said rearwardly facing flat surface,
 (3) cooperative means in said rearwardly facing flat surface to engage said indexing means, and
 (4) means for securing said plate to said hub,
(c) a plurality of propeller or impeller blades for mounting to said mounting plate, each of said blades being comprised of;
 (1) a first relatively flat longitudinally extending plate,
 (2) a structural member bent to form second and third integrally connected relatively flat and longitudinally extending plates,
 (3) said second and third plates being secured to said first plate and said three longitudinal plates being angulated with respect to each other thereby providing a substantially triangular blade in cross section and in which the three plates form a substantially hollow interior chamber in said blade, one of said second or third plates functioning as a leading plate and the other of said second or third plates functioning as a trailing plate in the blade and said first plate functioning as a ram side of said blade and serving as a pressure plate,
 (4) said blade having a hub end and a tip end,
 (5) means forming an opening at said tip end communicating with said hollow interior chamber, and
 (6) means forming an opening at said hub end communicating with said hollow interior chamber, and
(d) means for mounting each of said blades to said mounting plate, each said means for mounting being comprised of:
 (1) a first block located on the exterior of said blade and having a surface in facewise contact with one of the plates of said blade, said first block also being located in facewise contact with said mounting plate,
 (2) a second block located on the interior of said blade in facewise contact with the same one of the plates of said blade as said first block, said second block having a surface which is in facewise contact with said last named plate of said blade and which surfaces are generally parallel to each other, and
 (3) bolt means extending through one of said blocks and into the other of the blocks to thereby secure the blade to the mounting plate.

24. The construction of claim 23 further characterized in that said blades are tapered from said hub end to said tip end so that at least one of said plates of each blade are tapered from the hub end to the tip end.

25. The construction of claim 24 further characterized in that said blades are provided with an opened portion to vent and decrease fluid flow from a high pressure side to a low pressure side of said blade when rotating.

26. The construction of claim 24 further characterized in that said interior chamber has a constantly and progressively reduced cross sectional area from said hub end to said tip end and with the shape of said cross sectional area being substantially constant from said hub end to said tip end, means forming an opening in said hub end in fluid communication with said interior chamber, means forming an opening in said tip end to permit entrance of fluid, the opening at said tip permitting escapement of said fluid, the reduction in said cross sectional area being sufficient so that centrifugal force created by the rotation of said blade causes compression of said fluid and escapement from said opening in said tip end.

27. The construction of claim 26, further characterized in that said other opening formed in the hub end of said blade lies in a plane substantially parallel to a plane in which the opening at the tip end lies.

28. The construction of claim 26, further characterized in that a plurality of fluid escapement apertures are formed on the back side of said blades to permit fluid passage into a low pressure area present at the back side of said blades when rotating.

29. The construction of claim 26 further characterized in that said indexing means comprises a shoulder for locating and mounting said flat plate, and said cooperative means comprises a recess in said flat plate.

30. The construction of claim 29 further characterized in that said flat plate includes means for properly locating and mounting said blades to said plate.

31. The construction of claim 29 further characterized in that bolt means secured said flat plate to said sleeve.

32. The construction of claim 31 further characterized in that said mounting blocks also function as shims and the flat surfaces of said blocks in facewise contact with said blades enable the locating of said blades at a dihedral angle with respect to said plate.

33. The construction of claim 32, further characterized in that said construction provides a plurality of sleeves having different sized central bores to accommodate different shafts and with each sleeve having a shoulder capable of fitting into the recess on said flat plate is that each sleeve can be mounted to said flat plate.

* * * * *